United States Patent
Yi et al.

(10) Patent No.: US 11,585,825 B2
(45) Date of Patent: Feb. 21, 2023

(54) WIND SPEED SENSOR BASED ON A FLEXIBLE INDUCTOR AND A SILICON-BASED INDUCTOR

(71) Applicant: SOUTHEAST UNIVERSITY, Nanjing (CN)

(72) Inventors: Zhenxiang Yi, Nanjing (CN); Yu Wang, Nanjing (CN); Wenjun Deng, Nanjing (CN); Lifeng Wang, Nanjing (CN); Ming Qin, Nanjing (CN); Qingan Huang, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 168 days.

(21) Appl. No.: 17/054,133

(22) PCT Filed: Sep. 26, 2019

(86) PCT No.: PCT/CN2019/108032
§ 371 (c)(1),
(2) Date: Nov. 9, 2020

(87) PCT Pub. No.: WO2020/108064
PCT Pub. Date: Jun. 4, 2020

(65) Prior Publication Data
US 2021/0123940 A1    Apr. 29, 2021

(30) Foreign Application Priority Data
Nov. 27, 2018  (CN) .......................... 201811423034.6

(51) Int. Cl.
*G01P 5/08* (2006.01)

(52) U.S. Cl.
CPC ....................................... *G01P 5/08* (2013.01)

(58) Field of Classification Search
None
See application file for complete search history.

(56) References Cited

U.S. PATENT DOCUMENTS

2011/0283811 A1* 11/2011 Huang .................... G01F 1/692
                                                        73/861.64
2017/0199216 A1*  7/2017 Yi ............................. G01P 5/08

FOREIGN PATENT DOCUMENTS

| CN | 101819214 A  | * | 9/2010  | ............... G01P 5/10 |
| CN | 101900743 A  | * | 12/2010 | ............... G01P 5/08 |
| CN | 204008693 U  | * | 12/2014 | ............... G01P 5/10 |
| CN | 107907707 A  | * | 4/2018  | ............... G01P 13/02 |
| WO | WO-2014116205 A1 | * | 7/2014 | ............... G01P 5/02 |

* cited by examiner

*Primary Examiner* — Harshad R Patel
(74) *Attorney, Agent, or Firm* — CBM Patent Consulting, LLC

(57) ABSTRACT

Disclosed is a wind speed sensor based on a flexible inductor and a silicon-based inductor, which relates to a MEMS device and belongs to the field of measurement and testing technologies. The wind speed sensor is a double-layer inductor structure composed of a flexible inductor and a silicon-based inductor. A metal layer of the flexible inductor and a metal layer of the silicon-based inductor face to each other and form, between them, an air cavity sufficient for mutual induction of electromotance. A contact block constituting a measuring port is deposited in the metal layer of the silicon-based inductor. The present invention has a light structure, and implements wind speed detection based on the Bernoulli effect and the coil mutual inductance effect.

7 Claims, 3 Drawing Sheets

WIND SPEED SENSOR BASED ON A FLEXIBLE INDUCTOR AND A SILICON-BASED INDUCTOR

TECHNICAL FIELD

The present invention discloses a wind speed sensor based on a flexible inductor and a silicon-based inductor, which relates to a MEMS device and belongs to the field of measurement and testing technologies.

BACKGROUND

Wind speed measurement, which is closely related to people's lives, is widely used in various fields, such as industrial construction, agricultural production, aerospace, transportation, tourism, weather forecasting and environmental protection. In the early days, the measurement of wind speed was mainly realized by mechanical wind cups and wind vanes. In recent years, wind speed sensors, which are based on the principle of ultrasound and Doppler's Principle, have appeared. However, in general, due to their large sizes and high costs, these wind speed sensors cannot meet the application requirements of miniaturization and low power consumption in the Internet of Things technology.

Neil Bernoulli proposed the "Bernoulli's Principle" in 1726. This is the basic principle of hydraulics before the continuum theory equation of fluid mechanics is established, the essence of which is the fluid mechanical energy conservation, namely: kinetic energy+gravitational potential energy+pressure potential energy=constant. Bernoulli's Principle is often expressed as a formula called Bernoulli's Equation: $p+1/2\rho v^2+\rho gh=C$, where p is the pressure at a certain point in the fluid, v is the fluid velocity at that point, $\rho$ is the fluid density, g is the gravitational acceleration, h is the height of the point, and C is a constant. According to Bernoulli's Principle, we can get an important inference: when flowing at a constant height, the higher the fluid velocity, the lower the pressure.

The phenomenon of mutual inductance is widely used in circuits, in which energy or signals can be transferred from one coil to another. The basic principle of mutual inductance is magnetic coupling. If two coils are approaching to each other, part of the magnetic flux generated by the current in the first coil will link with the second coil, and the change of the current in the first coil will lead to the change of its magnetic flux linked with the second coil, thereby generating an induced electromotance in the second coil. The magnitude of the coefficient of mutual inductance depends on the geometries, sizes, relative position, respective turns of the two coils and the magnetic permeability of the medium around them.

This application aims to implement a wind speed sensor having a light structure and low loss based on the Bernoulli effect and the coil mutual inductance effect.

SUMMARY

An object of the present invention is to overcome the shortcomings described in the above background by providing a wind speed sensor based on a flexible inductor and a silicon-based inductor, which implements wind speed detection based on the Bernoulli effect and the principle of coil mutual inductance, and solves the technical problem that the existing wind speed sensors, due to their large sizes and high costs, cannot meet the application requirements in the Internet of Things technology, such as miniaturization and low power consumption.

The present invention performs the following technical solutions to achieve the above-mentioned object of the present invention:

A wind speed sensor based on a flexible inductor and a silicon-based inductor includes an upper flexible inductor and a lower silicon-based inductor. The flexible inductor is composed of a PET substrate and a spiral coil located on a lower surface of the PET substrate. The silicon-based inductor is composed of a silicon substrate, a spiral coil on an upper surface of the substrate and contact blocks at both ends of the spiral coil. An air gap is formed between the upper flexible inductor and the lower silicon-based inductor. The contact block on upper surface of the silicon substrate constitutes a measuring port.

When no wind is blowing, the flexible inductor and the silicon-based inductor are parallel to each other, the mutual inductance between the two is constant, and the central frequency point of the silicon-based inductor remains unchanged. When wind is blowing, due to the Bernoulli effect, the pressure inside the air cavity formed between the two layers of the flexible inductor and silicon-based inductor structure is less than the external pressure. At this time, the flexible inductor bends downward, and the degree of bending increases with the wind speed, so that the mutual inductance between the flexible inductor and the silicon-based inductor changes, resulting in a change of the central frequency point of the silicon-based inductor.

The detection method of the above speed sensor is as follows: the central frequency point is obtained by measuring an input return loss $(S_{11})$ curve of the silicon-based inductor measuring port, and a corresponding wind speed value can be obtained through conversion, so that the wind speed measurement is implemented.

The wind speed sensor disclosed in the present application can also be realized by a double-layer inductor structure composed of an upper silicon-based inductor and a lower flexible inductor, the working principle and detection method of which are the same as the dual-inductor structure having the upper flexible inductor and the lower silicon-based inductor.

The present invention performs the above technical solutions and has the following beneficial effects:

(1) The present invention realizes a wind speed sensor through a double-layer inductor structure containing a flexible inductor. The application of the flexible inductor having a characteristic of instantaneous deformation to the wind speed sensor enables the entire wind speed sensor to have a light structure and a fast response speed.

(2) Wind speed detection is implemented based on the Bernoulli effect and the coil mutual inductance effect. In addition, the inductors themselves have little thermal losses, so that the power of the sensor is reduced.

(3) The present application can be practiced by using existing flexible inductors and silicon-based inductors and thus has the advantage of small size and low cost compared with existing wind speed sensors.

Figure 1:
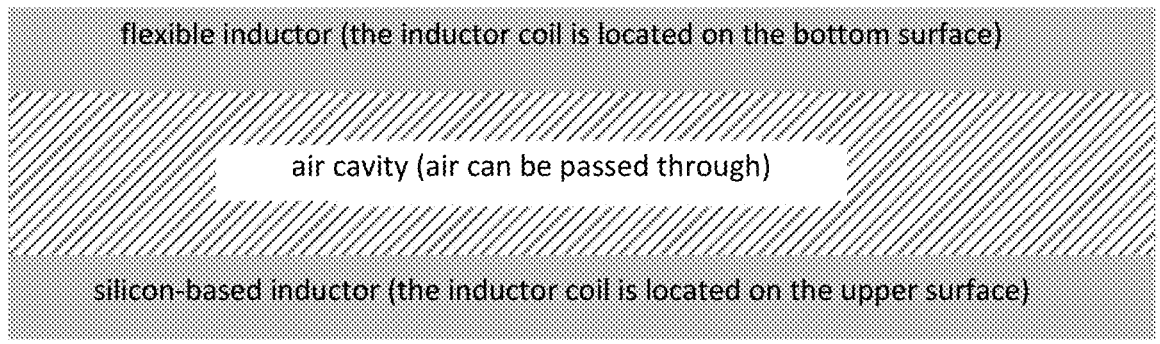
FIG. 1 is a schematic structural diagram of a wind speed sensor based on a flexible inductor and a silicon-based inductor.

Reference numerals in the figures are: 1. PET substrate, 2. spiral coil, 3. silicon substrate, 4. spiral coil, 5. contact block, 6. contact block.

DETAILED DESCRIPTION

The technical solutions of the present invention will be described in detail below in conjunction with the drawings.

Figure 2:
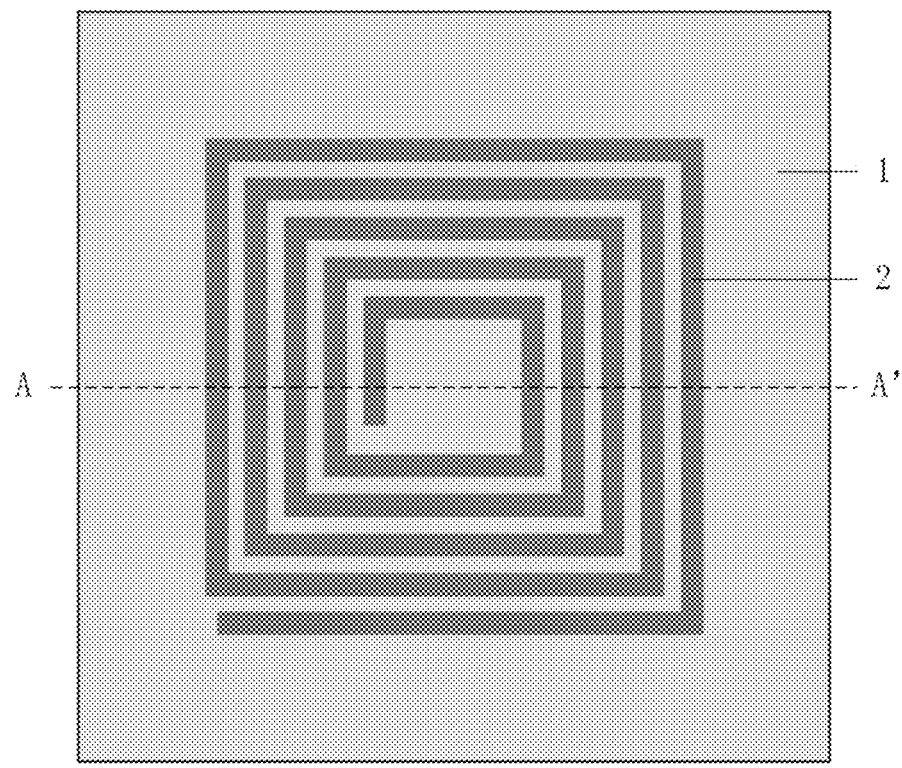
FIG. 2 is a metal layer of a flexible inductor of the wind speed sensor based on a flexible inductor and a silicon-based inductor.
Figure 3:
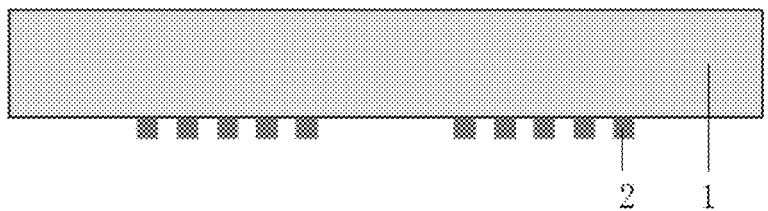
FIG. 3 is a cross-sectional view of the flexible inductor of the wind speed sensor based on a flexible inductor and a silicon-based inductor taken along AA'.
Figure 4:
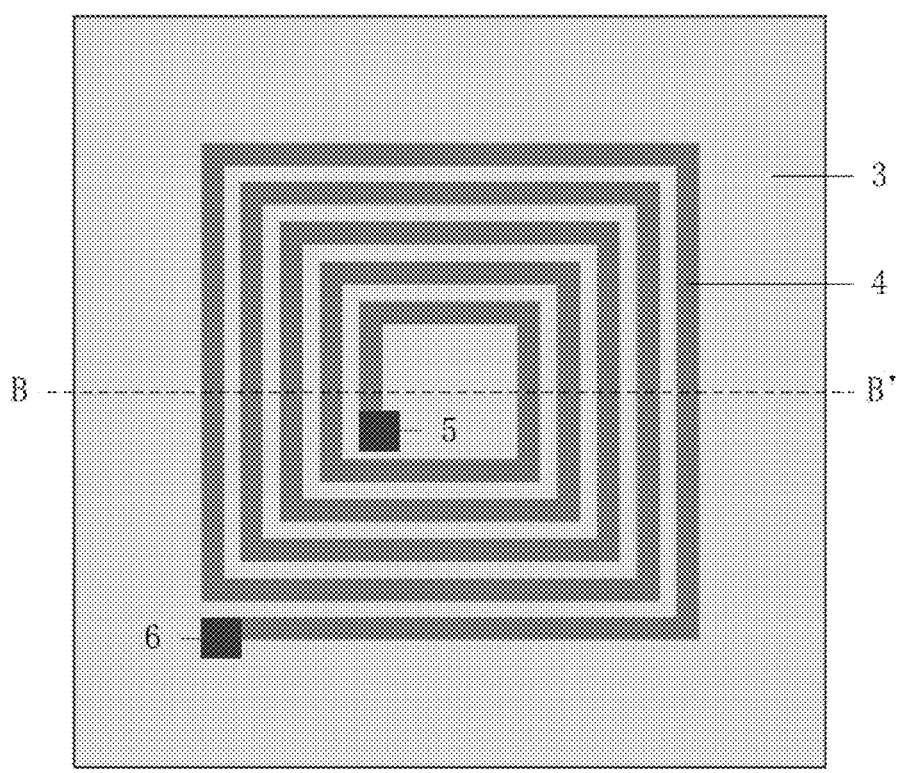
FIG. 4 is a metal layer of a silicon-based inductor of the wind speed sensor based on a flexible inductor and a silicon-based inductor.
Figure 5:
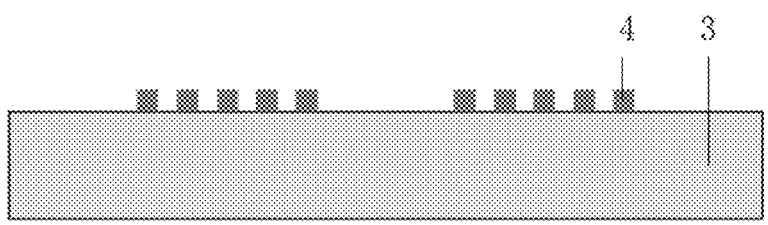
FIG. 5 is a cross-sectional view of the silicon-based inductor of the wind speed sensor based on a flexible inductor and a silicon-based inductor taken along BB'.

A wind speed sensor disclosed in the present application as shown in FIG. 1 includes two portions, an upper flexible inductor and a lower silicon-based inductor, between which an air cavity is formed in communication with the external environment. The flexible inductor as shown in FIGS. 2 and 3 is composed of a PET substrate 1 and a spiral coil 2 located on a lower surface of the PET substrate 1. The silicon-based inductor as shown in FIGS. 4 and 5 is composed of a silicon substrate 3, a spiral coil 4 located on an upper surface of the silicon substrate 3, and contact blocks 5 and 6 on both ends of the spiral coil.

Figure 6:
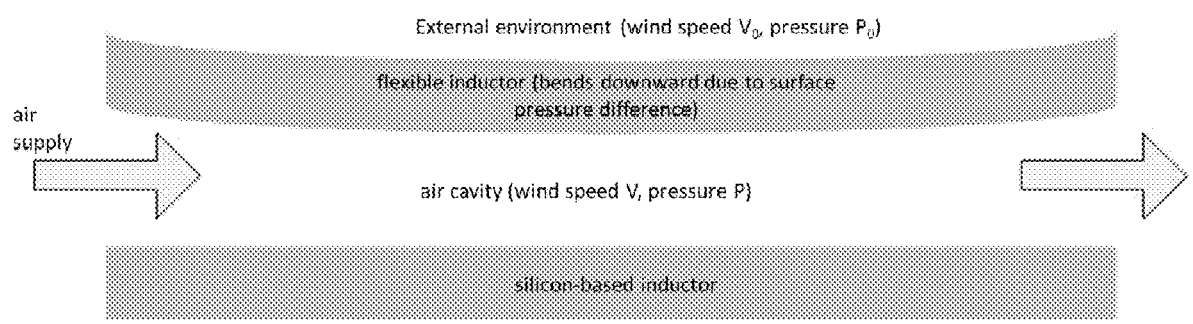
FIG. 6 is a schematic diagram of the Bernoulli effect of the wind speed sensor based on a flexible inductor and a silicon-based inductor.

During the operation of the wind speed sensor, the silicon-based inductor is connected to a test circuit through the contact blocks 5 and 6, and the test circuit passes current into the spiral coil 4. Due to electromagnetic induction, a magnetic field is generated around the spiral coil 4, and the magnetic field is coupled to the flexible inductor due to the mutual inductance effect and generates a mutual inductive electromotance in the spiral coil 2. When no wind is blowing, the flexible inductor and the silicon-based inductor remain parallel to each other, the mutual inductance between the two and thus the central frequency point of the silicon-based inductor remains unchanged. When wind is blowing, as shown in FIG. 6, the wind passes through the air cavity, so that the air velocity is u inside the cavity. According to the Bernoulli's Principle, the pressure P inside the cavity is less than the external pressure Po. The flexible inductor bends downward due to the pressure difference between the upper and lower sides, so that the distance between it and the silicon-based inductor becomes smaller, and the mutual inductance between the two increases, resulting in a change of the central frequency point of the silicon-based inductor. Finally, the central frequency point is obtained according to the $S_{11}$ curve of the silicon-based inductor, and the wind speed to be measured can be obtained through retrodiction.

Compared with traditional MEMS wind speed sensors, due to the use of flexible materials, the wind speed sensor based on a flexible inductor and a silicon-based inductor has a light structure, instantaneous deformation and fast response. Moreover, the inductors themselves have little thermal losses, so that the power of the sensor is reduced.

The preparation process of the wind speed sensor based on the flexible spiral coil structure proposed by the present application is as follows:

(1) The Upper Flexible Inductor
 a. prepare a PET substrate 1;
 b. spin-coat a photoresist, perform lithography and etching, and remove the photoresist at a position where a spiral coil 2 is prepared;
 c. evaporate Cu deposition and strip off the photoresist to form the spiral coil 2;

(2) The Lower Silicon-Based Inductor
 a. prepare a silicon substrate 3;
 b. spin-coat the photoresist, perform lithography and etching, and remove the photoresist at positions where a spiral coil 4, a contact block 5 and a contact block 6 are prepared;
 c. evaporate Cu deposition and strip off the photoresist to form the spiral coil 4, the contact block 5 and the contact block 6.

The above are merely the preferred embodiments of the present invention. It should be pointed out that for those of ordinary skill in the art, several improvements and modifications can be made without departing from the principle of the present invention, and these improvements and modifications should also be regarded as the protection scope of the present invention.

What is claimed is:

1. A wind speed sensor based on a flexible inductor and a silicon-based inductor, wherein the wind speed sensor is a double-layer inductor structure composed of a flexible inductor and a silicon-based inductor; a metal layer of the flexible inductor and a metal layer of the silicon-based inductor face to each other and form, between them, an air cavity sufficient for mutual induction of electromotance; a contact block constituting a measuring port is deposited in the metal layer of the silicon-based inductor.

2. The wind speed sensor based on a flexible inductor and a silicon-based inductor according to claim 1, wherein the flexible inductor is an upper inductor structure and the silicon-based inductor is a lower inductor structure.

3. The wind speed sensor based on a flexible inductor and a silicon-based inductor according to claim 1, wherein the silicon-based inductor is an upper inductor structure and the flexible inductor is a lower inductor structure.

4. The wind speed sensor based on a flexible inductor and a silicon-based inductor according to claim 1, wherein the flexible inductor is formed by depositing a metal layer on a flexible substrate; a photoresist is spin-coated on the flexible substrate, the photoresist at the position where an inductance coil is required to be prepared is etched away, the metal layer is deposited by evaporation, and then the photoresist is stripped off to form the inductance coil.

5. The wind speed sensor based on a flexible inductor and a silicon-based inductor according to claim 1, wherein the silicon-based inductor is formed by depositing a metal layer on a silicon substrate; a photoresist is spin-coated on the silicon substrate, the photoresist at the position where an inductance coil and the contact block are required to be prepared is etched away, the metal layer is deposited by evaporation, and then the photoresist is stripped off to form the inductance coil and the contact block.

6. The wind speed sensor based on a flexible inductor and a silicon-based inductor according to claim 4, wherein the flexible substrate is a Polydimethylsiloxane acid substrate.

7. A method for detecting a wind speed by using the wind speed sensor based on a flexible inductor and a silicon-based inductor according to claim 1, comprising steps of: fixing the flexible inductor and the silicon-based inductor and adjusting a distance between them to form an air cavity sufficient for mutual induction of electromotance; blowing air into the air cavity; detecting an input return loss at the measuring port; determining a central frequency point of the silicon-based inductor according to an input return loss curve; and retrodicting a relational expression between the central frequency point of the silicon-based inductor and the wind speed to determine a wind speed measurement value.

\* \* \* \* \*